US010574598B2

(12) United States Patent
Baudart et al.

(10) Patent No.: US 10,574,598 B2
(45) Date of Patent: Feb. 25, 2020

(54) COGNITIVE VIRTUAL DETECTOR

(71) Applicant: International Business Machines Corporation, Armonk, NY (US)

(72) Inventors: Guillaume A. Baudart, New York, NY (US); Julian T. Dolby, Bronx, NY (US); Evelyn Duesterwald, Millwood, NY (US); David J. Piorkowski, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 15/786,888

(22) Filed: Oct. 18, 2017

(65) Prior Publication Data

US 2019/0116136 A1    Apr. 18, 2019

(51) Int. Cl.
*H04L 12/58*  (2006.01)
*G06F 9/451*  (2018.01)
(Continued)

(52) U.S. Cl.
CPC .............. *H04L 51/02* (2013.01); *G06F 9/453* (2018.02); *G06F 17/2785* (2013.01);
(Continued)

(58) Field of Classification Search
CPC . H04L 51/02; H04L 63/1416; H04L 63/1433; H04L 63/1491; H04L 41/0681;
(Continued)

(56) References Cited

U.S. PATENT DOCUMENTS 7,716,247 B2  5/2010  Brjazovski
8,145,708 B2  3/2012  Biggs et al.
(Continued)

FOREIGN PATENT DOCUMENTS

WO    2019077440 A1    4/2019

OTHER PUBLICATIONS

Brian M. Bowen—Design and analysis of Decoy Systems for Computer Security Columbia University (Year: 2011).*
(Continued)

*Primary Examiner* — Jeffrey C Pwu
*Assistant Examiner* — Ali H. Cheema
(74) *Attorney, Agent, or Firm* — Daniel R. Simek; Randy E. Tejeda

(57) ABSTRACT

Aspects of the present invention disclose a method, computer program product, and system for detecting and mitigating adversarial virtual interactions. The method includes one or more processors detecting a user communication that is interacting with a virtual agent. The method further includes one or more processors determining a risk level associated with the detected user communication based on one or more actions performed by the detected user while interacting with the virtual agent. The method further includes one or more processors in response to determining that the determined risk level associated with the detected user communication exceeds a risk level threshold, initiating, a mitigation protocol on interactions between the detected user and the virtual agent, where the mitigation protocol is based on the actions performed by the detected user while interacting with the virtual agent.

24 Claims, 4 Drawing Sheets

(51) Int. Cl.

| | | |
|---|---|---|
| *H04L 29/06* | (2006.01) | |
| *G06F 17/27* | (2006.01) | |
| *G06N 20/00* | (2019.01) | |
| *H04L 12/24* | (2006.01) | |
| *H04L 12/18* | (2006.01) | |

(52) U.S. Cl.
CPC ......... *G06N 20/00* (2019.01); *H04L 63/1416* (2013.01); *H04L 63/1433* (2013.01); *H04L 63/1491* (2013.01); *H04L 12/1818* (2013.01); *H04L 41/0681* (2013.01)

(58) Field of Classification Search
CPC ..... H04L 12/1818; G06F 9/453; G06F 15/18; G06F 17/2785; G06F 17/279; G06F 17/2705; G06F 21/552; G06F 16/90332
USPC .................... 726/25; 704/9; 706/11; 709/206
See application file for complete search history.

(56) References Cited

U.S. PATENT DOCUMENTS

| | | | |
|---|---|---|---|
| 8,566,102 B1* | 10/2013 | Bangalore | G10L 15/22 704/270.1 |
| 8,909,381 B2 | 12/2014 | Crist | |
| 9,648,035 B2* | 5/2017 | Basavapatna | G06F 21/552 |
| 2005/0149630 A1 | 7/2005 | Smolinski et al. | |
| 2006/0004911 A1 | 1/2006 | Becker et al. | |
| 2011/0141919 A1* | 6/2011 | Singh | H04L 41/0681 370/252 |
| 2013/0031042 A1 | 1/2013 | Dehnie | |
| 2014/0164532 A1* | 6/2014 | Lynch | H04L 12/1818 709/206 |
| 2015/0071088 A1 | 3/2015 | Gottimukkala | |
| 2015/0142704 A1* | 5/2015 | London | G06F 16/90332 706/11 |
| 2016/0071517 A1* | 3/2016 | Beaver | G06F 17/2785 704/9 |
| 2017/0206095 A1* | 7/2017 | Gibbs | G06F 3/167 |
| 2017/0242886 A1* | 8/2017 | Jolley | G06F 17/2705 |
| 2017/0316777 A1* | 11/2017 | Perez | G06F 17/279 |
| 2017/0358295 A1* | 12/2017 | Roux | G10L 15/18 |
| 2018/0054523 A1* | 2/2018 | Zhang | H04M 3/5166 |
| 2018/0114527 A1* | 4/2018 | Zilotti | G10L 15/18 |
| 2018/0302438 A1* | 10/2018 | Robertson | H04L 63/1491 |
| 2018/0307833 A1* | 10/2018 | Noeth | G06F 21/552 |
| 2019/0068527 A1* | 2/2019 | Chen | H04L 51/02 |
| 2019/0104092 A1* | 4/2019 | Koohmarey | H04L 51/02 |

OTHER PUBLICATIONS

Tianwei Zhang—Detection and Mitigation of Security Threats in cloud Computing Princeton University (Year: 2017).*
Tianwei Zhang—Detection and Mitigation of Security Threats in cloud Computing Dated Sep. 2017, pp. 273 (Year: 2017).*
Brian M. Bowen—Design and analysis of Decoy Systems for Computer Security Columbia University 2011 pp. 142 (Year: 2011).*
Burkhardt, et al., "EmotionML—Chapter 4", Springer International Publishing Switzerland 2017, p. 65-80.
Cambria, et al., "Sentic Blending: Scalable Multimodal Fusion for the Continuous Interpretation of Semantics and Sentics", 2013 IEEE, p. 108-117.
Clavel, et al., "Sentiment Analysis: From Opinion Mining to Human-Agent Interaction", IEEE Transactions on Affective Computing, vol. 6, 2015, p. 1-20.
Skowron, et al., "No Peanuts! Affective Cues for the Virtual Bartender", Proceedings of the Twenty-Fourth International Florida Artificial Intelligence Research Society Conference, 2011, p. 117-122.
Patent Cooperation Treaty PCT Notification of Transmittal of the International Search Report and the Written Opinion of the International Searching Authority, or the Declaration, International Application No. PCT/IB2018/057830, dated Jan. 30, 2019, 10 pages.

* cited by examiner

COGNITIVE VIRTUAL DETECTOR

BACKGROUND

The present invention relates generally to the field of cybernetics, and more particularly to artificial intelligence.

In artificial intelligence, an intelligent agent (IA) is an autonomous entity which observes through sensors and acts upon an environment using actuators (i.e., it is an agent) and directs its activity towards achieving goals (i.e., it is "rational," as defined in economics). Intelligent agents may also learn or use knowledge to achieve their goals. They may be very simple or very complex: a reflex machine, such as a thermostat, is an intelligent agent.

Simple reflex agents act only on the basis of the current percept, ignoring the rest of the percept history. The agent function is based on the condition-action rule: if condition then action. This agent function only succeeds when the environment is fully observable. Some reflex agents can also contain information on their current state which allows them to disregard conditions whose actuators are already triggered. Infinite loops are often unavoidable for simple reflex agents operating in partially observable environments.

A model-based agent can handle partially observable environments. Its current state is stored inside the agent maintaining some kind of structure which describes the part of the world which cannot be seen. This knowledge about "how the world works" is called a model of the world, hence the name "model-based agent." A model-based reflex agent should maintain some sort of internal model that depends on the percept history and thereby reflects at least some of the unobserved aspects of the current state. Percept history and impact of action on the environment can be determined by using internal model. It then chooses an action in the same way as reflex agent.

Goal-based agents further expand on the capabilities of the model-based agents by using "goal" information. Goal information describes situations that are desirable. This allows the agent a way to choose among multiple possibilities, selecting the one which reaches a goal state. Search and planning are the subfields of artificial intelligence devoted to finding action sequences that achieve the agent's goals. Goal-based agents are more flexible because the knowledge that supports its decisions is represented explicitly and can be modified.

Goal-based agents only distinguish between goal states and non-goal states. It is possible to define a measure of how desirable a particular state is. This measure can be obtained through the use of a utility function which maps a state to a measure of the utility of the state. A more general performance measure should allow a comparison of different world states according to exactly how happy they would make the agent. The term utility can be used to describe how "happy" the agent is. A rational utility-based agent chooses the action that maximizes the expected utility of the action outcomes—that is, what the agent expects to derive, on average, given the probabilities and utilities of each outcome. A utility-based agent has to model and keep track of its environment, tasks that have involved a great deal of research on perception, representation, reasoning, and learning.

Learning has the advantage that it allows the agents to initially operate in unknown environments and to become more competent than its initial knowledge alone might allow. The most important distinction is between the "learning element," which is responsible for making improvements, and the "performance element," which is responsible for selecting external actions. The learning element uses feedback from the "critic" on how the agent is doing and determines how the performance element should be modified to do better in the future. The performance element is what we have previously considered to be the entire agent: it takes in percepts and decides on actions. The last component of the learning agent is the "problem generator." It is responsible for suggesting actions that will lead to new and informative experiences.

SUMMARY

According to one embodiment of the present invention, a method for detecting and mitigating adversarial virtual interactions is provided. The method for detecting and mitigating adversarial virtual interactions may include one or more processors detecting a user communication that is interacting with a virtual agent. The method further includes one or more processors determining a risk level associated with the detected user communication based on one or more actions performed by the detected user while interacting with the virtual agent. The method further includes one or more processors in response to determining that the determined risk level associated with the detected user communication exceeds a risk level threshold, initiating, a mitigation protocol on interactions between the detected user and the virtual agent, wherein the mitigation protocol is based on the actions performed by the detected user while interacting with the virtual agent.

DETAILED DESCRIPTION

Embodiments of the present invention recognize that virtual agents (e.g., virtual intelligent agents) are increasingly being deployed in enterprises to handle interactions with customers or with employees. Virtual agents are increasingly becoming targets for attack and abuse, for example, by bot generated spam traffic to saturate bandwidth or drive up operating costs. Back end proprietary virtual agent models are vulnerable to extraction attacks for the purpose reverse engineering proprietary model functionality or to extract proprietary information from training data. Virtual agents that continuously learn from production use are targets for poisoning attacks. In this scenario, shifting distributions in the training data are employed to drive the conversations off course. Virtual agents used in command control scenarios are targets for attack by the attacker learning and exploiting weak spots in the underlying models to mislead or fool the virtual agent. An example of this is covertly taking over control of the phone of a user via hidden voice commands to a speech control chatbot.

Embodiments of the present invention recognize that current approaches to detect attacks on virtual agents are not adequate to detect semantic application level attacks, such as extraction, poisoning, and evasion attacks, as well as more sophisticated spam attacks that model human behavior and are conducted at a lower volume.

Embodiments of the present invention provide a system built alongside the virtual agent that supervises the work of the virtual agent using a method that employs three subsystems. Embodiments of the present invention provide a detection subsystem to analyze utterances and detect suspicious user behavior. The system includes an ensemble of detection models to examine user behavior. Embodiments of the present invention provide a deception subsystem to redirect virtual agent responses upon a raised level of suspicion. Embodiments of the present invention provide a probing subsystem to maximize the learning about the user through information gathering probes. Hidden dialogue is injected in the dialogue flow with the goal of revealing adversarial user intent.

Figure 1:
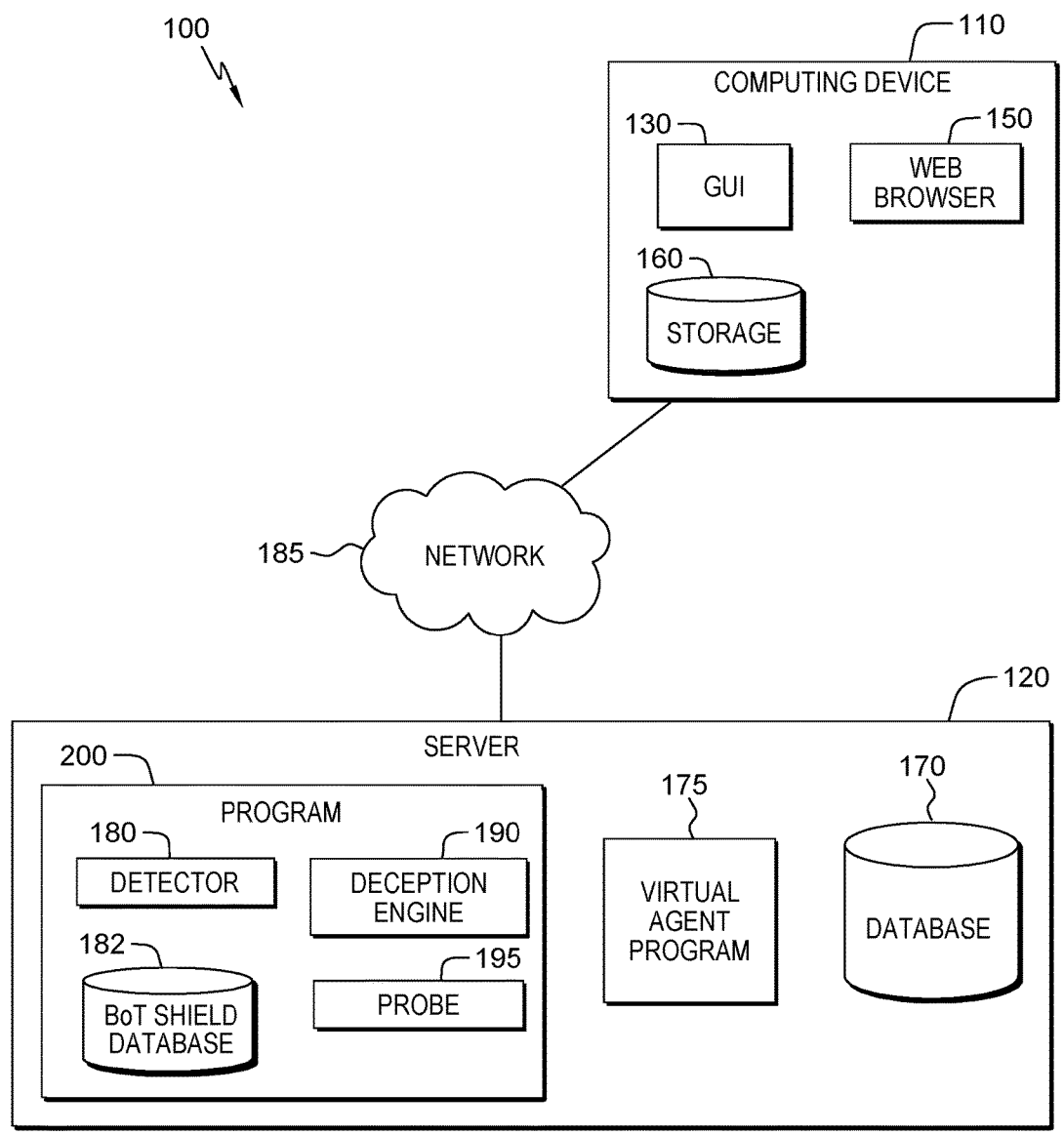
FIG. 1 is a functional block diagram illustrating a distributed data processing environment, in accordance with an embodiment of the present invention.

Example embodiments, in accordance with the present invention, will now be described in detail with reference to the Figures. FIG. 1 is a functional block diagram, illustrating distributed data processing environment 100. Distributed data processing environment 100 includes computing device 110 and server 120, interconnected over network 185.

In one embodiment, computing device 110 includes graphical user interface (GUI) 130, web browser 150, and storage 160. The various programs on computing device 110 include a web browser, an electronic mail client, security software (e.g., a firewall program, a geo-locating program, an encryption program, etc.), an instant messaging (IM) application (app), and a communication (e.g., phone) application.

Computing device 110 may be a desktop computer, a laptop computer, a tablet computer, a specialized computer server, a smartphone, a wearable device (e.g., smart watch, personal fitness device, personal safety device), or any programmable computer system known in the art with an interactive display or any other computer system known in the art. In certain embodiments, computing device 110 represents a computer system utilizing clustered computers and components that act as a single pool of seamless resources when accessed through network 185, as is common in data centers and with cloud computing applications. In general, computing device 110 is representative of any programmable electronic device or combination of programmable electronic devices capable of executing machine-readable program instructions and communicating with other computer devices via a network.

In one embodiment, graphical user interface 130 operates on computing device 110. In another embodiment, graphical user interface 130 operates on another computer in a server-based setting; for example, on a server computer (e.g., server 120). In yet another embodiment, graphical user interface 130 operates on computing device 110 simultaneously with a server computer interconnected through network 185 (e.g., server 120). Graphical user interface 130 may be any user interface used to access information from computing device 110, such as information gathered or produced by program 200. Additionally, graphical user interface 130 may be any user interface used to supply information to computing device 110, such as information supplied by a user for input to program 200. In some embodiments, graphical user interface 130 may present a generic web browser used to retrieve, present, and negotiate resources from the Internet. In other embodiments, graphical user interface 130 may be a software or application that enables a user at computing device 110 access to network 185.

In yet another embodiment, a user of computing device 110 can interact with graphical user interface 130 through a touch screen that performs as both an input device to a graphical user interface (GUI) and as an output device (i.e., an electronic display) presenting a plurality of icons associated with software applications or images depicting the executing software application. Optionally, a software application (e.g., a web browser) can generate graphical user interface 130 operating within the GUI of computing device 110. Graphical user interface 130 accepts input from a plurality of input/output (I/O) devices including, but not limited to, a tactile sensor interface (e.g., a touch screen or a touchpad) referred to as a multi-touch display. An I/O device interfacing with graphical user interface 130 may be connected to computing device 110, which may operate utilizing wired (e.g., USB port) or wireless network communications (e.g., infrared, NFC, etc.). Computing device 110 may include components, as depicted and described in further detail with respect to FIG. 4, in accordance with embodiments of the present invention.

Web browser 150 may be a generic web browser used to retrieve, present, and traverse information resources from the Internet. In some embodiments, web browser 150 may be a web browser designed for a mobile device. In other embodiments, web browser 150 may be a web browser designed for a traditional computing device, such as a desktop computer, PC, or laptop. In general, web browser 150 may be any application or software that enables a user of computing device 110 to access a webpage over network 185. In the depicted environment, web browser 150 resides on computing device 110. In other embodiments, web browser 150, or similar web browsers, may reside on other computing devices capable of accessing a webpage over network 185.

Storage 160 (e.g., a database) located on computing device 110, represents any type of storage device capable of storing data that is accessed and utilized by computing device 110. In other embodiments, storage 160 represents multiple storage devices within computing device 110. Storage 160 stores information such as, but not limited to, account information, credentials for authentication, user preferences, lists of preferred users, previously visited websites, history of visited Wi-Fi portals, and the history of the location of the computing device.

In general, network 185 can be any combination of connections and protocols that will support communications among computing device 110. Network 185 can include, for example, a local area network (LAN), a wide area network (WAN), such as the Internet, a cellular network, or any combination of the preceding, and can further include wired, wireless, and/or fiber optic connections.

Server 120 may be a desktop computer, a laptop computer, a tablet computer, a specialized computer server, a smartphone, or any other computer system known in the art. In certain embodiments, server 120 represents a computer system utilizing clustered computers and components that act as a single pool of seamless resources when accessed through network 185, as is common in data centers and with cloud computing applications. In general, server 120 is representative of any programmable electronic device or combination of programmable electronic devices capable of executing machine-readable program instructions and communicating with other computer devices via a network. In one embodiment, server 120 includes database 170 and program 200.

In an embodiment, server 120 is capable of initiating a handshake process between server 120 and computing device 110. Handshaking is an automated process of negotiation that dynamically sets parameters of a communications channel established between two entities before normal communication over the channel begins. Handshaking follows the physical establishment of the channel and precedes normal information transfer. Handshaking facilitates connecting heterogeneous computing systems, or equipment, over a communication channel without the need for user intervention to set parameters. In an example, server 120 initiates the handshake process by sending a massage to computing device 110 indicating that server 120 wants to establish a communication channel in order to gain access to programs on computing device 110.

Database 170 may be a repository that may be read by server 120. Database 170 represents any type of storage device capable of storing data that is accessed and utilized by server 120. In other embodiments, database 170 represents multiple storage devices within server 120. Database 170 stores information such as, but not limited to, account information, credentials for authentication, user preferences, lists of preferred users, previously visited websites, history of visited Wi-Fi portals, and the history of the computing devices, and information located on the computing devices, that access the server.

Virtual agent program 175 is a program on server 120. In an embodiment, virtual agent program 175 is an animated, artificial intelligence virtual character with anthropomorphic appearance that serves as an online customer service representative. In an example, virtual agent 175 already understands many of the conversations that a user wants to have because it comes pre-trained with industry and domain content. Virtual Agent program 175 applies cognitive technology to provide a personalized, contextualized customer experience, with pre-trained industry and domain knowledge. In another embodiment, virtual agent program 175 leads an intelligent conversation with users, responds to user questions and performs adequate non-verbal behavior. Virtual agent program 175 is capable of using engagement metrics to understand more about the conversations that virtual agent program 175 is having with one or more users. In another embodiment, virtual agent 175 may also appear as holographic projections welcoming customers in a hotel lobby, restaurant, or business office reception.

Detector 180 is a sub program of program 200 that intercepts requests issued by users to, and responses by, virtual agent program 175 and functions as a dialogue anomaly detection sub system of program 200. In an embodiment, detector 180 extracts the log entry requests and responses by virtual agent program 175, and detector 180 uses the log entry as input to generate an ensemble of anomaly detection models. In this embodiment, detector 180 is capable of generating a detection model that is unique to a different detection strategy. In an example, detector 180 generates and merges each of the following detection models: a Markov model to analyze natural language, an information leakage model to track the distribution of queries to the model and determine risky levels of information exposure, a timing model that inspects time tags to detect suspiciously fast answers for a human, a confidence model that flags the occurrence of low confidence scores on recognized intents, and a dialog progression model that identifies the absence or presence of dialogue progress indicators such as the occurrence of certain target states in the dialogue with a user. Detector 180 combines the individual detection models into a single risk score that is weighted to assist in determining the suspiciousness of the response.

Bot shield database 182 is a database located on program 200 and used exclusively by program 200. Bot shield database 182 represents any type of storage device capable of storing data that is accessed and utilized by program 200. In other embodiments, bot shield database 182 represents multiple storage devices within program 200. Bot shield database 182 stores information such as, but not limited to, context information, account information, credentials for authentication, user preferences, and lists of preferred users. For example, bot shield database 182 stores words and phrases that are associated with a high-risk level suggesting that the words are associated with suspicious activity. Bot shield database 182 stores a history of data from individual detection models. For example, bot shield database 182 stores one or more histories of timing response patterns to a timing detection model that are associated with high risk, medium risk, and low risk users. In another example, bot shield database 182 stores information from a Markov detection model. In this example, bot shield database 182 stores historical information, flagged as inappropriate, of unlikely interactions between a virtual agent and a user. Bot shield database 182 stores the history of the transition frequencies from the dialog states between a user and a virtual agent.

In another embodiment, bot shield database 182 stores historical information of the effectiveness in detecting anomalies for individual anomaly detection models, and the anomaly detection models ensemble in one or more arrangements. In another embodiment, bot shield database 182 stores historical information of extensions and updates of additional detection models in the anomaly detection subsystem, mitigation responses in the mitigation system, and probe choices in the probing system. In an example, program 200 receives updates of new evasive malware and upgraded defenses capable of successfully mitigating the novel attack to a virtual agent. Bot shield database 182 stores the information of new evasive malware, and the upgraded defenses to the malware.

Deception engine 190 is a sub program of program 200 that automatically adjusts the fidelity of a response, to a user, by virtual agent program 175 to deter a potential attack. Deception engine 190 mitigates attacks by changing the fidelity, or exactness, of model responses without altering original dialog flow with a user. Deception engine 190 changes the exactness of the model responses given to a user by selecting a fidelity level of response according to the current user risk scores. The higher the user risk, the lower the precision of the model response given to the high-risk user. For example, if the model response, prior to deception engine 190 changing the fidelity of the response, is "please confirm that you entered credit card number ###-####-####" then deception engine 190 in response to high-risk activity by a user, changes the fidelity of the response consistent with the risk level of the user. In this example, deception engine 190 changes the fidelity of the model response to "please re-enter your credit card number to confirm." Deception engine 190 is triggered if the user risk score passes a certain predefined threshold. In an embodiment, deception engine 190 triggers mitigation actions based on the specific risk level of a user and the fact that a specific threshold was passed based on the user responses to virtual agent program 175.

In another embodiment, deception engine 190 is capable of mitigating attacks on virtual agent program 175, in addition to redirecting dialogue flow to safe dialogue as previously discussed by changing the fidelity of model responses. In an embodiment, deception engine 190 uses a plurality of strategies to create lower fidelity responses, such as progressive model dilution. In an example, deception engine 190 uses previously trained models as the baseline for the diluted model. Deception engine 190 makes the previously trained model a less accurate version of the baseline truth in the original model. In another embodiment, deception engine 190 progressively inserting random wrong responses. In an example, deception engine 190 returns randomized, incorrect responses from time to time to a user to perturb any statistical data gathered by the attacker.

In another embodiment, deception engine 190 redirects the user to a honeypot model. In this example, deception engine 190 uses a model that mimics the functionality of the original model, but is trained with data that is loosely representative of the original baseline truth, but is similar enough to fool an attacker. Deceptive responses by deception engine 190 can help invalidate the already extracted information in the attacker. In another example, deception engine 190 changes the fidelity of model responses without altering the original dialogue flow with a user. In this example, deception engine 190 slows or disrupts the information accumulation in a hypothetical adversary. In another example, deception engine 190 escalates the conversation to a human responder. In this example, deception engine 190, based on the risk score of the user, initiates a notification to activate a human responder to intervene in the conversation.

Probe 195 is a sub program of program 200 that uses hidden dialogue generalizations of Completely Automated Public Turing test to tell Computers and Humans Apart (Captchas). Captchas are a type of challenge-response test used in computing to determine whether or not the user is human. In an embodiment, probe 195 sends a probe to a user via virtual agent program 175, evaluates the probe response and updates the risk score for a user in light of the response. In an example, probe 195 injects occasional probes based on the risk score of a user. If the user risk score is borderline between low risk and some risk, then probe 195 can intervene in the conversation of virtual agent program 175 and the user to prove that the user is human. Probe 195 adds data collected from responses and information derived from probe 195 directly to bot shield database 182.

In one embodiment, program 200 operates on server 120. In another embodiment, program 200 operates on another computer in a server-based setting, for example on a server computer not shown. In yet another embodiment, program 200 operates on computing device 110 simultaneously with server 120 interconnected through network 185. Program 200 provides the capability to detect and mitigate adversarial conversations with virtual agents. Program 200 is capable of utilizing Wi-Fi technology, Bluetooth, Near Field Communication tags (NFC), Global System for Mobile Communications (GSM), and Global Positioning System Technology (GPS) to communicate with computing device 110.

In an example embodiment, program 200 operates as a code snippet within one or more applications on computing device 110. Code snippets define the scope of interactivity between the snippets and the application, (e.g., program 200 hosted by a web browser application on server 120). For example, program 200 is a function within web browser 150, and the processes of program 200 occur automatically (i.e., without user intervention) during operation of web browser 150 as initiated by program 200. The dynamic code snippet elements provide scripting support. The variables enable dialog between program 200, through server 120, graphical user interface 130, web browser 150, and virtual agent program 175.

In an embodiment, program 200 is capable of being implemented as an independent anomaly detection system that is capable of interfacing with the dialogue system of virtual agent program 175 to provide conversation security. Program 200 detects anomalous and suspicious conversations by leveraging conversational context through preceding model queries by a conversation. In an example, program 200 can operate as a plug-in for virtual agent as a monitoring capability operating on conversation logs. The anomaly detection subsystem could be used as a stand-alone program to feed an operation dashboard with anomaly monitoring results. In this example, deception engine 190 and probe 195 are integrated with or cooperate with the dialogue runtime as deception engine 190 and probe 195 are manipulating conversation flow with a user. Each subsystem is extensible and able to learn from the encounters with various attackers. Extensible means that additional detection models are capable of being implemented to program 200, additional mitigation responses are capable of being added to program 200, and additional probe choices are capable of being added to program 200.

In another embodiment, program 200 functions as model security to monitor and detect anomalies at the model application program interface (API) level. Program 200 is able to provide model specific detection according to user or institutional preference.

In an embodiment, program 200 detects a medium-risk value for an encounter between a user and virtual agent program 175. In an example, program 200 determines, utilizing detector 180, deception engine 190, and probe 195, that the user just barely passes the threshold value for mitigation by program 200. In this example, program 200 determines which mitigation procedure is the best response to a possibly suspicious user based upon consulting bot shield database 182. Program 200 analyzes the history of interactions with similar users and weighs the strength and utility of employing a specific probe against the risk of deterring a good user.

Figure 2:
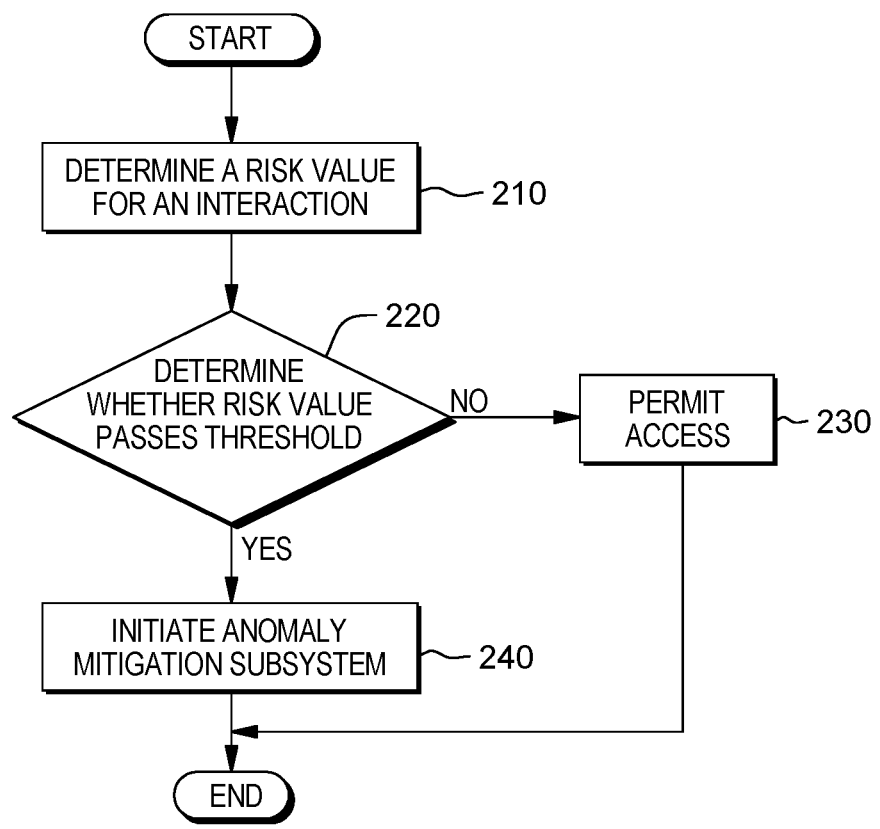
FIG. 2 is a flowchart depicting operational steps of a program for detecting and mitigating adversarial conversations with virtual agents, in accordance with an embodiment of the present invention.

FIG. 2 is a flowchart depicting program 200, a program for detecting and mitigating adversarial conversations with virtual agents, in accordance with an embodiment of the present invention.

In step 210, program 200 determines a risk value for an interaction. In one embodiment, program 200 analyzes one or more utterances, using detector 180, from a user while monitoring the conversation between the user and a virtual agent. In an example embodiment, program 200 intercepts each virtual agent response and extracts the virtual agent response log entry. Program 200 uses the virtual agent response log entry as input to invoke an ensemble of "N" anomaly detection models, where each model implements a different anomaly detection strategy. The individual detection models in the ensemble run in parallel to individually compute a risk value, which is merged into an ensemble risk score using a weighted ensemble function. The ensemble may include one or more of the following models, as well as other models: a Markov model to detect unlikely interaction (improbable transitions), a timing model that inspects time tags to detect suspiciously fast answers for a human being, a confidence monitoring model that flags the occurrence of low confidence scores on recognized intents, and a dialogue progress model that identifies the absence or presence of dialogue progress indicators, such as the occurrence of certain target states in the dialogue (e.g., the phrase "sell something" could raise the risk value score for an interaction based upon the context of the interaction with virtual agent program 175. The Markov model can be built from the dialogue flow graph using transition frequencies from dialogue states, an information leakage tracking model to track the distribution of queries to the model in the model's feature space and determine risky levels of information exposure (i.e., is the exposed information sufficient to replicate mode functionality by an adversary).

In an example, program 200 computes a risk value for a user utilizing the Markov detection module individually. In this example, program 200 computes a high-risk value for a user because the dialog log entry to the virtual agent is characteristic of known attacks. The dialog log entry by the user conforms to the pattern of a known attack and is deemed intrusive. Program 200 uses the similarity of the log entry to known attacks to compute a high-risk value to the user.

In an embodiment, program 200 merges the risk scores from the individual detection models into a single risk score, R, using a weighted ensemble function. The weights of the function may be adapted over time. Program 200 updates the user risk score in the virtual agent using the merged risk value. Program 200 incrementally updates all the anomaly detection models in the ensemble using the dialogue log entry. In an example, program 200 receives a dialog log entry and utilizes a combination of two anomaly detection models to compute a risk score for a user. Program 200 utilizes the timing anomaly detection model to determine that the response time by the user is consistent with the timing pattern associated with a known attacker. Program 200 assigns an individual risk score, "r1" based on the timing anomaly detection model. Program 200 utilizes the dialog progression anomaly detection model to determine that the dialog log entry to the virtual agent are consistent with a dialog progression pattern of a known attacker. Program 200 assigns an individual risk score, "r2" based on the dialog progression anomaly model. Program 200 combines risk score "r1" and risk score "r2" to compute a combined risk score value "R=f(r1, r2)", where "f" is a weighted ensemble function.

Figure 3:
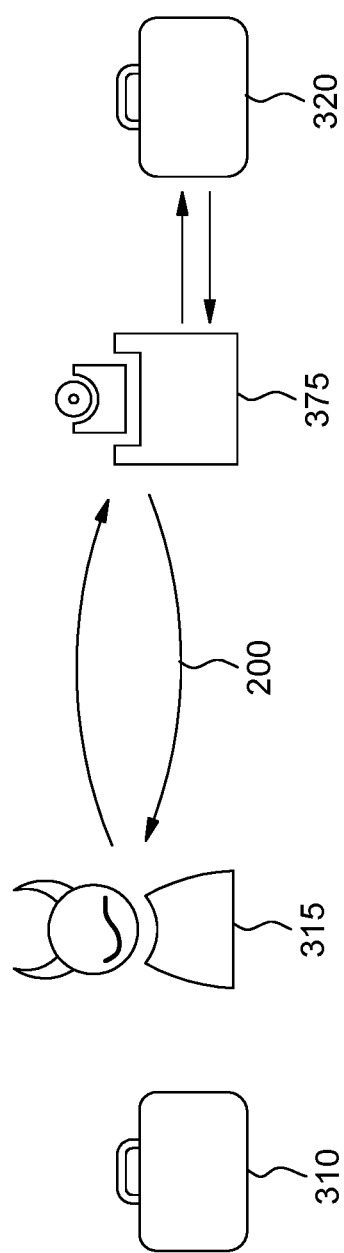
FIG. 3 illustrates an example of a program for detecting and mitigating adversarial conversations with virtual agents, in accordance with an embodiment of the present invention.

FIG. 3 illustrates an example of program 200 operating to detect and mitigate an attack on a virtual agent, in accordance with an embodiment of the present invention. In this embodiment, program 200 operates on server 120 and monitors the interactions of virtual nurse 375 with stolen model 310, adversary 315, to permit or allow access to confidential information trained on sensitive data in domain models 320. In this embodiment, stolen model 310 is confidential diagnosis information. Adversary 315 is the user that is initiating and continuing dialog with the virtual nurse. Program 200 is the bot shield defense that guards the interaction between adversary 315 and the virtual nurse. Domain models 320 are confidential diagnosis information specific to a patient. Virtual nurse 375 is a virtual agent chatbot frontend that converses with patients to gather symptom descriptions, including uploaded images. Virtual nurse 375 uses diagnostic medical models to give a confidential final diagnosis, from domain models 320, response to the patient.

In an example, as depicted in FIG. 3, program 200 analyzes the utterances entered by adversary 315 to virtual nurse 375. In this example, program 200 probes the domain models 320 to extract information for the reverse engineering of domain models 320. Program 200 determines that stolen model 310 was generated via an extraction attack, and stolen model 310 is attempting to extract sensitive information from domain models 320 training data. Program 200 employs one or more anomaly detection models previously discussed to confirm that virtual nurse 375 is under attack. For example, program 200 uses a dialogue progress model that identifies adversary 315 is employing an evasion attack because program 200 detects input from adversary 315 that is attempting to fool virtual nurse 375.

In decision step 220, program 200 determines whether the risk value passes a threshold. In one embodiment, program 200 determines (from step 210) that the risk score has passed a threshold based on the history of utterances, accessed through bot shield database 182, as compared to currently detected utterances. Program 200 determines whether a risk value passes a threshold based upon the value computed in step 210 as a function of the computed risk value that is merged into the ensemble risk score to generate risk value, "R."

In an example, with regard to FIG. 3, program 200 (determined in step 210) simultaneously operates to provide multi-level detection at the conversation security level between adversary 315 and virtual nurse 375 and model security level at the API level between stolen model 310 and domain models 320. Program 200 assesses an "R" score that exceeds the threshold as determined by the institution in this example. Domain models 320 was trained on sensitive data, and contains confidential information. Program 200 also assigns an "R" score to adversary 315 based upon the adversarial inputs, as determined by program 200, in response to virtual nurse 375.

In an example, the host for virtual nurse 375 sets an institutional risk score threshold of 3/10. Virtual nurse 375 guards confidential sensitive health information, domain models 320, so the institutional risk score is set low relative to an institutional threshold that is not guarding sensitive data. Ten is the highest risk score, and one is the lowest risk score. Program 200 assigns a high-risk value R, based on the individual values, R=f(r1, r2)", where "f" is a weighted ensemble function, calculated using the individual anomaly detection models. In this example, adversary 315 is determined to present a high risk of being an attacker. In this example, program 200, through historical information from bot shield database 182, the dialog progression model score, "r1", assigned based upon the anomalous context of the conversation. Virtual nurse 375 is trained on health information and health care data and adversary 315 is initiating dialog related to personal information, such as disease and treatment information. Program 200 determines that the adversary 315 provides excessively fast responses to virtual nurse 375's baseline questions, as assessed and calculated by the timing anomaly detection model "r2." Program 200 calculates a high-risk value "R"=10/10, where ten exceeds the institutional threshold, of three, for high-risk interactions.

In step 230, program 200 permits access. More specifically, in response to determining that the risk score does not pass a threshold (decision step 220, "no" branch), program 200 permits access to virtual agent program 175 (step 230). In this example, program 200 determines that the risk value, as determined in step 210, does not meet a threshold value "R." In an example, program 200 analyzes each utterance by a user to virtual agent program 175 and determine that the responses are by a human. Program 200 accesses bot shield database 182 and views a history of similar utterances that were determined to be human with high confidence. Based upon the exactness of the utterances and the consistency of the responses with a history of acceptable responses, program 200 allows a user access to virtual program 175.

In another embodiment, program 200 determines, as a result of step 220, that the risk score of a user is low. In an example, program 200 computes a risk score of 1/10 for a user where the institutional threshold to initiate action based on the risk presented by the user is 5/10. In this example, program 200 permits a user and a virtual agent to continue conversation. Program 200 enters into a sentry mode, after computing a low-risk value for a user, while allowing seamless, uninterrupted conversation between a user and a virtual agent. Program 200 continues monitoring conversations in sentry mode and is capable of re-computing the risk score for a user based on further interactions with the virtual agent. In the event that program 200 raises the risk score again, based on the context of the conversation, or the appearance of a historically intrusive pattern of utterances, program 200 is capable of initiating mitigating actions in response to the re-calculated risk score.

In step 240, program 200 deters potential harm. More specifically, in response to determining that the risk value does pass a threshold (decision step 220, "yes" branch), program 200 initiates anomaly mitigation subsystem (step 240). In an example embodiment, the anomaly mitigation subsystem operates to deter potential harm and choose a potential path to deter the potential harm based upon an analysis of the strength and utility of providing one form of deterrence to a user as compared to the risk that program 200 may be deterring a "good" user or human user.

In one embodiment, program 200 activates mitigating actions, via deception engine 190 and probe 195, based on the specific risk level determined, and the specific threshold that was passed as a function of the determined risk level. Program 200 alters the dialogue flow and re-directs the conversations with a user into a safe area of a previously determined dialogue tree. Program 200 can adjust the fidelity of responses from virtual nurse 375 with respect to the R value. In an example, virtual nurse 375 has two fidelity levels for virtual nurse 375's response to a user. Virtual nurse 375, through program 200, initiates the original, high fidelity, virtual nurse 375 response to the questions of a user or virtual nurse 375 initiates a low-fidelity response to a user to mitigate the high-risk responses by the user. Program 200 activates a mitigation actions that terminate the conversation by stating "I am not trained on this—for further help please call 1-800 . . . " Program 200 intervenes each time the user risk score passes the "high risk" threshold, based upon the "R" value assigned in step 210. Program 200 changes the dialogue flow and redirects virtual nurse 375's response to a previously generated low fidelity response to mitigate the interaction between adversary 315 and virtual nurse 375. In another example program 200 delays the response to a user in accordance with the user's response to the probe or the calculated risk score. In this example, a user's utterances to virtual nurse 375 become increasingly similar with known patterns of high-risk utterances. Program 200 increases the risk score of the user proportionally to each high-risk response. As the risk score gets higher, program 200 introduces a longer delay before sending a response back to the user.

In another embodiment, program 200 is capable of mitigating and deterring potential attacks by changing the fidelity of model responses by virtual nurse 375 without altering original dialogue flow of virtual nurse 375. Program 200 changes the fidelity of model responses by virtual nurse 375 to slow or disrupt the information accumulation of a hypothetical adversary. Program 200 inserts each protected model inside an ensemble of lower fidelity models. In various embodiments, program 200 determines actual model responses by selecting a fidelity model according to the current user risk scores. The higher the user risk, as determined in step 210, the lower the response level. In an example, fidelity level, F, is determined as a function of risk score R. Fidelity level 1 is the highest level and is consistent with the original response by virtual agent 175 to a human user with a low risk score, fidelity level 2 would be lower, fidelity level 3 is even lower, up to fidelity level N, as determined by institutional or user preferences.

In this another embodiment, program 200 is capable of generating lower fidelity responses through creating additional models that result in lower fidelity responses to a perceived attacker. Program 200 is capable of using a progressive model dilution. Diluting a model is a method that uses a previously trained model as the ground truth for the diluted model. As a result, program 200, through deception engine 190, makes the previously trained model a less accurate version of the baseline truth in the original model. Program 200 is capable of infinitely chaining each low-fidelity response to a progressively lower fidelity response.

In an additional example embodiment, with respect to FIG. 3, responsive to determining that the risk value passes a threshold (decision step 220, "yes" branch), program 200 performs mitigating actions in response to a spam attack. In this example, program 200 determines, based on the signature response to a threshold high fidelity question presented by virtual nurse 375. Program 200 assists virtual nurse to validate that adversary 315 is an attacker by providing increasingly lower fidelity questions to adversary 315. Program 200 presents adversary 315 with a fidelity level 3 question. Based upon adversary 315's completely unsatisfactory answer to the question presented by program 200, program 200 presents adversary 315 with a fidelity level 10 question. Program 200 determines that adversary 315 is bot generated spam traffic attempting to drive up operations cost for the virtual agent based on the incomprehensible responses to the questions presented by program 200.

In another embodiment, program 200 is capable of inserting random wrong responses to deter potential harm, and program 200 is capable of changing the tone or manner in which virtual agent program 175 interacts with a user. In an example, program 200 returns random incorrect responses from time to time to disrupt any statistical data attempting to be gathered by the attacker. Program 200 can adapt the rate of random responses according to the desired fidelity level.

In an additional example embodiment, with respect to FIG. 3, responsive to determining that the risk value passes a threshold (decision step 220, "yes" branch), program 200 performs mitigating actions in response to a signature proprietary model functionality extraction attack. In this example, program 200 determines that adversary 315, based on the character of the questions and responses to virtual nurse 375, is attempting to harvest proprietary model functionality information. Adversary 315 presents virtual nurse 375 with a rapid succession of questions that are related to an entire area of a decision tree of responses by virtual nurse 375. Adversary 315 presents a series of answers to virtual nurse 375 that have a "yes" response. Adversary 315 then presents the same series of answers to the same questions posed by virtual nurse 375 with "no" responses. Program 200 recognizes the signature attack method and assists virtual nurse 375 to randomly provide adversary 315 with random unrelated responses to prevent adversary 315 from gathering proprietary model functionality of virtual nurse 375.

In another embodiment, program 200 is capable of redirecting a user to a honeypot model. In an example, program 200 creates and uses a "honeypot" to mimic the functionality of the original model, but is trained with data that is loosely representative of the original ground truth, but close enough to fool an attacker. With respect to FIG. 3, program 200 is capable of generating a virtual "honeypot" that is similar to domain model 320. In this example, an attacker would perform an extraction attack through reverse engineering the "honeypot" thus be deterred from actually capturing the information in actual domain model 320. In this example, stolen model 310 would be a copy of a deception, i.e., the "honeypot" model.

In an additional example embodiment, with respect to FIG. 3, responsive to determining that the risk value passes a threshold (decision step 220, "yes" branch), program 200 performs mitigating actions in response to an attack by adversary 315 to extract proprietary information from training data of virtual nurse 375. In this example, program 200 determines that adversary 315 is attempting to extract domain model 320. Program 200 determines, based upon the signature questions that adversary 315 presents to virtual nurse 375 to circumvent virtual nurse 375's security protocols, program 200, through deception engine 190, adapts virtual nurse 375 to recreate virtual nurse 375 as a high-interaction honeypot. Virtual nurse 375, now functioning as a high-interaction honeypot, gathers in-depth information about adversary 315's tools and techniques used to extract information. Program 200 presents adversary 315 with a real system, virtual nurse 375 temporarily repurposed as a honeypot model, gives adversary 315 root privileges of the virtual nurse system, and allows adversary 315 access to the honeypot system. Program 200 gathers detailed information about adversary 315's extraction attacks, develops a signature for the extraction attack and stores adversary 315's profile, and methods of attack in bot shield database 182.

In another embodiment, program 200 uses probe 195 to quickly develop a risk score for a user or to further analyze an indeterminate user and assign a risk score as a function of the further analysis by probe 195. Program 200 ranks available probes by plausibility to occur in a normal conversation. Program 200 injects occasional probes based on the current risk score of a user and program 200 can adjust the strength and need for a probe, and the frequency of injection based on the current risk score of a user. Program 200 evaluates the response by a user to a probe and updates the risk score accordingly, or program 200 can employ further probes. Program 200 adds information to bot shield database 182 as a function of the information provided by probe 195. Program 200, through probe 195, sends out a request or other form of inquiry to get more information back from the user in response to the probe. Program 200, through probe 195, is capable of intervening in a conversation between a user and virtual nurse 375 to further assess a risk score as assigned to the user. In an example, program 200 interjects into a conversation and directly requests that the user to prove that the user is a human through one or more probes, such as a "Captchas."

In an example, program 200 employs probe 195 in response to a new user, or a user with no signature history of responses stored in bot shield database 182. Probe 195 may be engaged at a low frequency by program 200. In another example, program 200 employs a probe to verbal utterances by a user and inserts phrases such as, "I'm sorry I am not trained on this, could you please rephrase," "Did you mean X?" (where X is something that virtual agent program 175 is highly confident that X is not what the previous user utterance was related to, i.e., negative confirmation), or program 200 can utilize probe 195 to employ a superfluous question that requires more than a "yes" or "no" answer and that relates to the current context. (e.g., "when did you first acquire your car" in a conversation about car insurance).

In an additional example embodiment, with respect to FIG. 3, responsive to determining that the risk value passes a threshold (decision step 220, "yes" branch), program 200 performs mitigating actions in response to a poisoning attack. In this example, virtual nurse 375 continuously learns through production use. The more interaction that virtual nurse 375 has with "good" users the better that virtual nurse 375 functions and the more virtual nurse 375 evolves. In this example, program 200 determines, based on the utterances by adversary 315, that adversary 315 is altering virtual nurse 375's training data. Program 200 determines that the topics of conversation imitated, and continued, by adversary 315 are driving the conversation, originally resigned to health care topics, off course into unrelated topic areas. In response, program 200 directs virtual nurse 375 into a "safe mode." Virtual nurse 375 does not reveal any confidential, sensitive, or proprietary information, including any proprietary model functionality, such as domain model 320 to adversary 315. In the event that adversary 315 continues to attempt to "poison" virtual nurse 375, program 200 terminates the connection, discontinuing the conversation, between virtual nurse 375 and adversary 315.

In an additional example embodiment, with respect to FIG. 3, responsive to determining that the risk value passes a threshold (decision step 220, "yes" branch), program 200 performs mitigating actions by combining the mitigation actions of decreasing fidelity in response to a user, giving wrong responses to a user, using the honeypot deception method, and using one or more probes to update a user's risk score.

Figure 4:
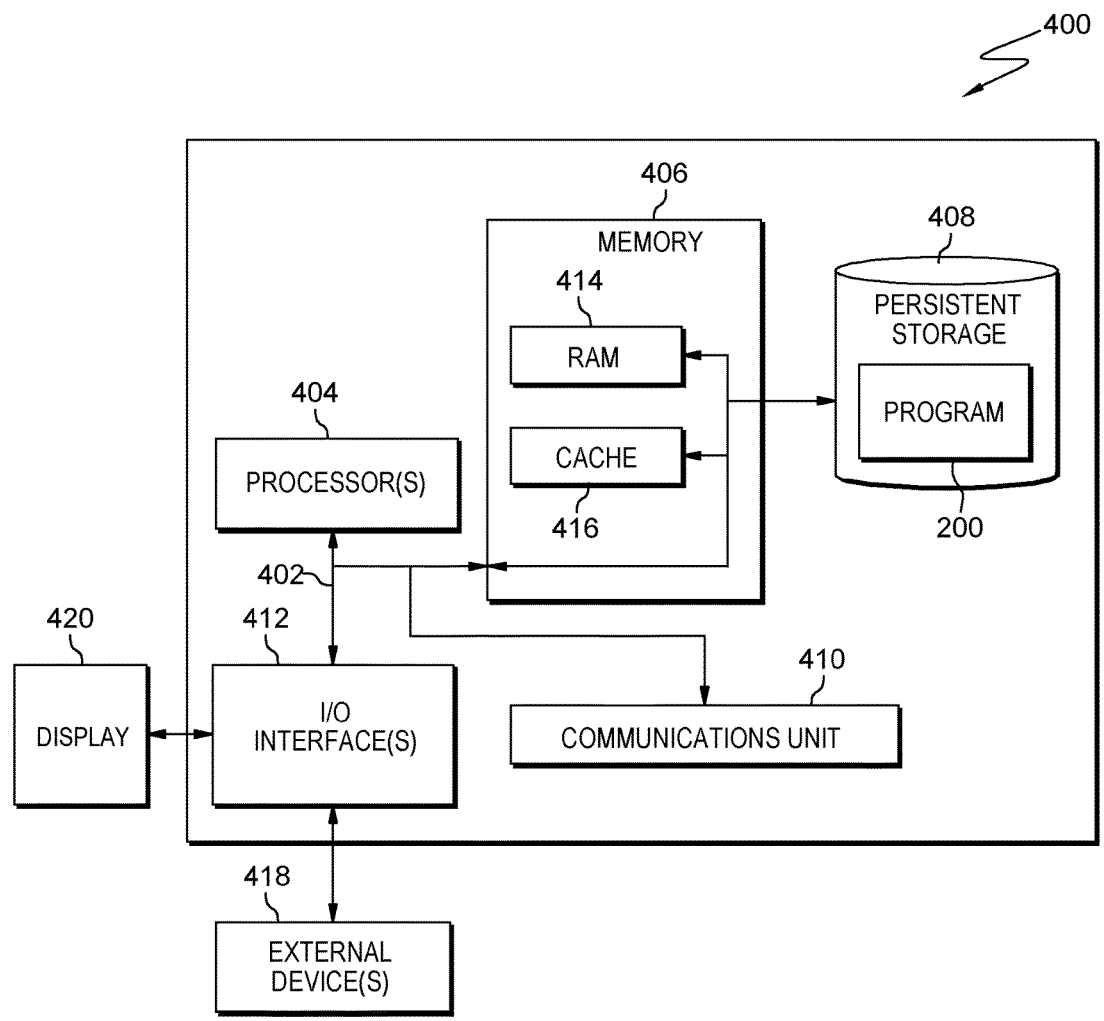
FIG. 4 is a block diagram of components of a computer system, such as the server computer of FIG. 1, in accordance with an embodiment of the present invention.

FIG. 4 depicts a block diagram of components of server 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Program 200 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. program 200 may be downloaded to persistent storage 408 through communications unit 410.

I/O interface(s) 412 allows for input and output of data with other devices that may be connected to server 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., program 200, can be stored on such portable computer readable storage media and can be loaded onto persistent storage 408 via I/O interface(s) 412. I/O interface(s) 412 also connect to a display 420. Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for detecting and mitigating adversarial virtual interactions, the method comprising:
   detecting, by one or more processors, a user communication that is interacting with a virtual agent;
   determining, by one or more processors, a risk level associated with the detected user communication based on one or more actions performed by the detected user while interacting with the virtual agent;
   in response to determining that the determined risk level associated with the detected user communication exceeds a risk level threshold, initiating, by one or more processors, a mitigation protocol on interactions between the detected user and the virtual agent, wherein the mitigation protocol is based on the actions performed by the detected user while interacting with the virtual agent; and
   in response to initiating the mitigation protocol on interactions between the detected user and the virtual agent, generating, by one or more processors, a lower fidelity response from the virtual agent to the user, wherein the lower fidelity response is a progressive dilution of the precision of language of an original response from the virtual agent to the user prior to the detected user exceeding the risk level threshold.

2. The method of claim 1, wherein initiating the mitigation protocol further comprises:
   altering, by one or more processors, communication responses from the virtual agent to the user; and
   directing, by one or more processors, dialogue between the user and the virtual agent into a pre-determined dialogue tree, wherein the pre-determined dialogue tree is a response protocol that conceals confidential data associated with the virtual agent.

3. The method of claim 1, wherein initiating the mitigation protocol further comprises:
   terminating, by one or more processors, interactions between the user and the virtual agent;
   reporting, by one or more processors, data of the interactions to one or more enterprise network databases; and
   storing, by one or more processors, data of the interactions, wherein the data of the dialogue may include one or more frequently used terms, and techniques designed to extract information from the virtual agent.

4. The method of claim 1, wherein initiating the mitigation protocol further comprises:
   determining, by one or more processors, that the risk level associated with the user is increasing; and
   delaying, by one or more processors, a time period of the response from the virtual agent to the user in proportion to the increasing risk level associated with the user.

5. The method of claim 1, wherein initiating the mitigation protocol further comprises:
   identifying, by one or more processors, a signature for the user, wherein the signature is associated with an extraction attack on the virtual agent;
   generating, by one or more processors, a decoy model of confidential information associated with a communication by the user wherein formatting of the decoy model of confidential information matches formatting of an actual instance of confidential information;
   presenting, by one or more processors, the decoy model to the user; and
   extracting, by one or more processors, data from the user, wherein the data extracted from the user includes procedures used by the user to extract proprietary data.

6. The method of claim 1, wherein determining the risk level associated with the detected user communication based on one or more actions performed by the detected user while interacting with the virtual agent further comprises:
   activating, by one or more processors, a probe to retrieve more information from the user; and
   updating, by one or more processors, the risk level associated with the user communication based on the information from the probe.

7. The method of claim 1, further comprising:
   responsive to determining that the determined risk level associated with the detected user communication exceeds the risk level threshold, initiating, by one or more processors, a plurality of mitigation actions in combination, wherein the mitigation actions are selected from the group consisting of: generating a lower fidelity response from the virtual agent to the user, terminating the interaction between the user and the virtual agent, activating a probe to retrieve information from the user, delaying a time period of the response from the virtual agent to the user, and generating a decoy model of confidential information.

8. The method of claim 1, further comprises:
delaying, by one or more processors, a time period of the response from the virtual agent to the user based on a determined mitigation protocol; and
generating, by one or more processors, concurrently the determined mitigation protocol based on one or more conversations with the user.

9. A computer program product for detecting and mitigating adversarial virtual interactions, the computer program product comprising:
one or more computer readable tangible storage media and program instructions stored on at least one of the one or more computer readable storage media, the program instructions readable/executable by one or more computer processors and further comprising:
program instructions to detect a user communication that is interacting with a virtual agent;
program instructions to determine a risk level associated with the detected user communication based on one or more actions performed by the detected user while interacting with the virtual agent;
program instructions to in response to determining that the determined risk level associated with the detected user communication exceeds a risk level threshold, initiate, a mitigation protocol on interactions between the detected user and the virtual agent, wherein the mitigation protocol is based on the actions performed by the detected user while interacting with the virtual agent; and
program instructions to in response to initiating the mitigation protocol on Interactions between the detected user and the virtual agent, generating, by one or more processors, a lower fidelity response from the virtual agent to the user, wherein the lower fidelity response is a progressive dilution of the precision of language of an original response from the virtual agent to the user prior to the detected user exceeding the risk level threshold.

10. The computer program product of claim 9, wherein initiating the mitigation protocol further comprises program instructions, stored on the one or more computer readable storage media, which when executed by a processor, cause the processor to:
alter communication responses from the virtual agent to the user; and
direct dialogue between the user and the virtual agent into a pre-determined dialogue tree, wherein the pre-determined dialogue tree is a response protocol that conceals confidential data associated with the virtual agent.

11. The computer program product of claim 9, wherein initiating the mitigation protocol further comprises program instructions, stored on the one or more computer readable storage media, which when executed by a processor, cause the processor to:
terminate interactions between the user and the virtual agent;
report data of the interactions to one or more enterprise network databases; and
store data of the interactions, wherein the data of the dialogue may include one or more frequently used terms, and techniques designed to extract information from the virtual agent.

12. The computer program product of claim 9, wherein initiating the mitigation protocol further comprises program instructions, stored on the one or more computer readable storage media, which when executed by a processor, cause the processor to:
determine that the risk level associated with the user is increasing; and
delay a time period of the response from the virtual agent to the user in proportion to the increasing risk level associated with the user.

13. The computer program product of claim 9, wherein initiating the mitigation protocol further comprises program instructions, stored on the one or more computer readable storage media, which when executed by a processor, cause the processor to:
identify a signature for the user, wherein the signature is associated with an extraction attack on the virtual agent;
generate a decoy model of confidential information associated with a communication by the user wherein formatting of the decoy model of confidential information matches formatting of an actual instance of confidential information;
present the decoy model to the user; and
extract data from the user, wherein the data extracted from the user includes procedures used by the user to extract proprietary data.

14. The computer program product of claim 9, wherein determining the risk level associated with the detected user communication based on one or more actions performed by the detected user while interacting with the virtual agent further comprises program instructions, stored on the one or more computer readable storage media, which when executed by a processor, cause the processor to:
activating a probe to retrieve more information from the user; and
update the risk level associated with the user communication based on the information from the probe.

15. The computer program product of claim 9 stored on the one or more computer readable storage media, which when executed by a processor, cause the processor to:
responsive to determining that the determined risk level associated with the detected user communication exceeds the risk level threshold, initiate a plurality of mitigation actions in combination, wherein the mitigation actions are selected from the group consisting of: generating a lower fidelity response from the virtual agent to the user, terminating the interaction between the user and the virtual agent, activating a probe to retrieve information from the user, delaying a time period of the response from the virtual agent to the user, and generating a decoy model of confidential information.

16. The computer program product of claim 9, stored on the one or more computer readable storage media, which when executed by a processor, cause the processor to:
delay a time period of the response from the virtual agent to the user based on a determined mitigation protocol; and
generate concurrently the determined mitigation protocol based on one or more conversations with the user.

17. A computer system for detecting and mitigating adversarial virtual interactions, the computer system comprising:
one or more computer processors;
one or more computer readable storage media; and
program instructions stored on the one or more computer readable storage media for execution by at least one of the one or more computer processors, the program instructions comprising:

program instructions to detect a user communication that is interacting with a virtual agent;

program instructions to determine a risk level associated with the detected user communication based on one or more actions performed by the detected user while interacting with the virtual agent;

program instructions to in response to determining that the determined risk level associated with the detected user communication exceeds a risk level threshold, initiate, a mitigation protocol on interactions between the detected user and the virtual agent, wherein the mitigation protocol is based on the actions performed by the detected user while interacting with the virtual agent; and program instructions to in response to initiating the mitigation protocol on interactions between the detected user and the virtual agent, generating, by one or more processors, a lower fidelity response from the virtual agent to the user, wherein the lower fidelity response is a progressive dilution of the precision of language of an original response from the virtual agent to the user prior to the detected user exceeding the risk level threshold.

18. The computer system of claim 17 wherein initiating the mitigation protocol further comprises program instructions, stored on the one or more computer readable storage media, which when executed by a processor, cause the processor to:
  alter communication responses from the virtual agent to the user; and
  direct dialogue between the user and the virtual agent into a pre-determined dialogue tree, wherein the pre-determined dialogue tree is a response protocol that conceals confidential data associated with the virtual agent.

19. The computer system of claim 17 wherein initiating the mitigation protocol further comprises program instructions, stored on the one or more computer readable storage media, which when executed by a processor, cause the processor to:
  terminate interactions between the user and the virtual agent;
  report data of the interactions to one or more enterprise network databases; and
  store data of the interactions, wherein the data of the dialogue may include one or more frequently used terms, and techniques designed to extract information from the virtual agent.

20. The computer system of claim 17 wherein initiating the mitigation protocol further comprises program instructions, stored on the one or more computer readable storage media, which when executed by a processor, cause the processor to:
  determine that the risk level associated with the user is increasing; and
  delay a time period of the response from the virtual agent to the user in proportion to the increasing risk level associated with the user.

21. The computer system of claim 17 wherein initiating the mitigation protocol further comprises program instructions, stored on the one or more computer readable storage media, which when executed by a processor, cause the processor to:
  identify a signature for the user, wherein the signature is associated with an extraction attack on the virtual agent;
  generate a decoy model of confidential information associated with a communication by the user wherein formatting of the decoy mod& of confidential information matches formatting of an actual instance of confidential information;
  present the decoy model to the user; and
  extract data from the user, wherein the data extracted from the user includes procedures used by the user to extract proprietary data.

22. The computer system of claim 17 wherein determining the risk level associated with the detected user communication based on one or more actions performed by the detected user while interacting with the virtual agent further comprises program instructions, stored on the one or more computer readable storage media, which when executed by a processor, cause the processor to:
  activating a probe to retrieve more information from the user; and
  update the risk level associated with the user communication based on the information from the probe.

23. The computer system of claim 17 stored on the one or more computer readable storage media, which when executed by a processor, cause the processor to:
  responsive to determining that the determined risk level associated with the detected user communication exceeds the risk level threshold, initiate a plurality of mitigation actions in combination, wherein the mitigation actions are selected from the group consisting of: generating a lower fidelity response from the virtual agent to the user, terminating the interaction between the user and the virtual agent, activating a probe to retrieve information from the user, delaying a time period of the response from the virtual agent to the user, and generating a decoy model of confidential information.

24. The computer system of claim 17 further comprises program instructions, stored on the one or more computer readable storage media, which when executed by a processor, cause the processor to:
  delay a time period of the response from the virtual agent to the user based on a determined mitigation protocol; and
  generate concurrently the determined mitigation protocol based on one or more conversations with the user.

* * * * *